United States Patent [19]

Habisohn

[11] 3,819,996

[45] June 25, 1974

[54] MULTIPLE SPEED MOTOR CONTROL SYSTEM

[75] Inventor: Victor J. Habisohn, Chicago, Ill.

[73] Assignee: Power Electronics International, Inc., Chicago, Ill.

[22] Filed: Aug. 28, 1972

[21] Appl. No.: 284,342

Related U.S. Application Data

[63] Continuation-in-part of Ser. No. 29,869, April 20, 1970, Pat. No. 3,716,770.

[52] U.S. Cl................. 318/224, 318/227, 317/230, 317/351, 318/391
[51] Int. Cl........................... H02p 1/28, H02p 1/38
[58] Field of Search ........... 318/173, 183, 191, 224, 318/227, 230, 233, 237, 351, 430, 431, 391, 308; 317/11 A; 200/145

[56] References Cited
UNITED STATES PATENTS

| 3,248,632 | 4/1966 | Bowman | 318/225 |
| 3,487,279 | 12/1969 | Stringer | 318/308 |
| 3,573,580 | 4/1971 | Shinozaki | 318/227 |

*Primary Examiner*—Bernard A. Gilheany
*Assistant Examiner*—Thomas Langer
*Attorney, Agent, or Firm*—Jerome Goldberg

[57] ABSTRACT

A power control system for driving a multispeed alternating current (AC) induction motor having at least a high speed mode and a low speed mode. Upon starting or reversing the direction of motor rotation or switching from one speed mode to another speed mode, the period for transferring electrical energy from a source to the motor is progressively increased from an initial time period to a greater time period of energy transfer per AC cycle.

Mechanical contactors may be used for connecting electrical voltage in a forward or reverse direction to the input of a static switching network and for connecting the high speed winding or low speed winding of the motor to the output of the switching network. Prior to making or breaking any of the connections of the contactors with the system, the static switching network is disabled to prevent energy transfer to the motor.

The system includes means for maintaining a minimum energy transfer from the source to the motor means for a predetermined time period, when decelerating from the high speed mode to the low speed mode.

66 Claims, 11 Drawing Figures

MULTIPLE SPEED MOTOR CONTROL SYSTEM

REFERENCE TO OTHER APPLICATION

This patent application is a continuation in-part of my co-pending patent application Ser. No. 29,869, Patent No. 3,716,770, entitled, "A Slow Start-Stop Motor Control System" filing date Apr. 20, 1970, and includes subject matter which is common to said earlier application.

BACKGROUND OF THE INVENTION

This invention relates generally to a motor control system and more particularly relates to a control system for an alternating current (AC) multispeed induction motor. Still more specifically the subject invention relates to a multispeed motor control system to provide soft and smooth transition after switching from one speed to another speed.

Single and multispeed AC induction motors are extensively used, such as, for example, for cranes, elevators. In order to prevent damage and loss of materials being transported and to increase the life of the machinery using such induction motors, it is imperative that the starting, stopping, reversing and switching between speeds be adequately controlled, to prevent jerking and harmful vibrations. The system disclosed in my prior application and the system disclosed herein, relates to smooth control of the start, stop and rotation reversal of AC motors. The subject invention, however, is also directed to smooth control of the transition, as the motor switches from one speed mode to another speed mode.

Previously, a primary problem with the use of AC multispeed motors was the tremendous counter torque that developed during the transition from one speed to another, particularly from high speed to low speed. In the high to low speed transition, the counter torque at times, was so great that it would weaken and even rip off the gears linked to the motor shaft. Furthermore, the jolting and vibrations were a frequent source for damage. To avoid this problem many prior systems used complex timer arrangements in conjunction with a bank of resistors. The resistors would be switched out of the circuit in timed sequence of steps to increase the energy transfer to the motor, as the counter torque dissipated. Although, the resistors afforded some control, appreciable shock and vibrations still existed. One of the primary features of the subject invention is to provide smooth and stepless transition as the motor accelerates or decelerates from one speed to another.

Accordingly, it is a primary object of this invention to provide a multispeed motor control system for smoothly controlling travel between two points.

Another primary object is to smoothly and softly control the transition between one speed and another speed, without causing jarring or harmful vibrations.

Another object is to provide a system for controlling the electrical power delivered to a multispeed motor. A related object is to control the three phase electrical power delivered to a high speed stator winding and to a low speed stator winding of a motor means.

Another object is to control the starting, stopping, and reversing of the rotational direction of a multispeed motor for any speed mode of the motor.

Another object is to control the torque and speed during the transition from one speed to another speed of the motor.

Another object is to provide mechanical contactor means for connecting electrical power and the motor to the control system.

Another object is to suppress arcing when switching the mechanical contactor means.

Another object is to initially maintain minimum energy transfer to the motor for a predetermined time period during the transition when the motor is decelerating to the low speed from a higher speed.

Another object is to provide adjustment means for controlling the rate of acceleration and deceleration in any speed mode of the motor.

BRIEF DESCRIPTION OF THE DRAWING

Referring to the drawings in which the same characters of reference are employed to indicate corresponding or similar parts throughout the several Figures of the drawings.

DESCRIPTION OF THE PREFERRED EMBODIMENT

Figure 2:
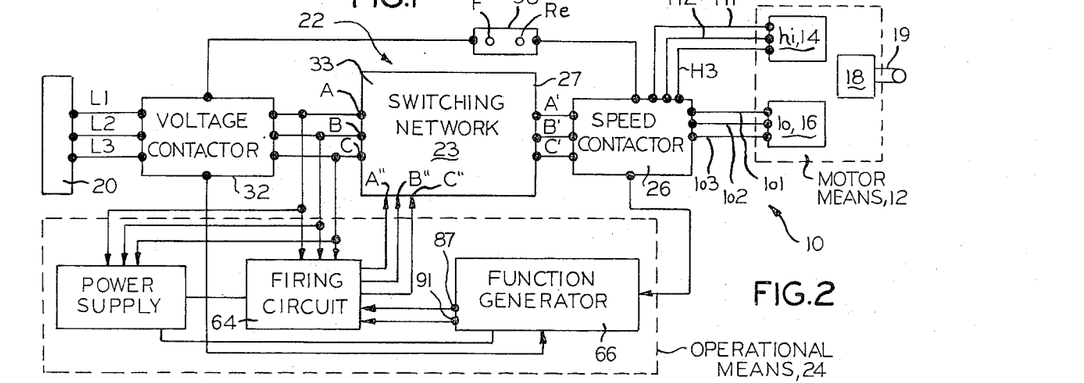
FIG. 2 is a block diagram of the power control system.

Referring now more particularly to FIG. 2 of the drawings, the reference numeral 10 indicates generally a motor control system for moving a load in a horizontal direction such as driving a crane bridge or trolley, or moving the load in the vertical director such as driving an elevator. The system 10 includes a motor means 12 comprising a three phase high (hi) speed stator winding means hi 14 and a three phase low (lo) speed stator winding means lo 16. In the described embodiment, stators 14 and 16 drive a rotor 18 respectively in a high speed mode or a low speed mode. The rotor 18, in turn, drives an output shaft 19.

Input alternating current (AC) three phase power lines L1, L2 and L3 are connected from the source 20 to the system 10. A three phase power control means 22 transfers electrical power from the source 20 either to the high speed stator 14 or the low speed stator 16.

Figure 1:
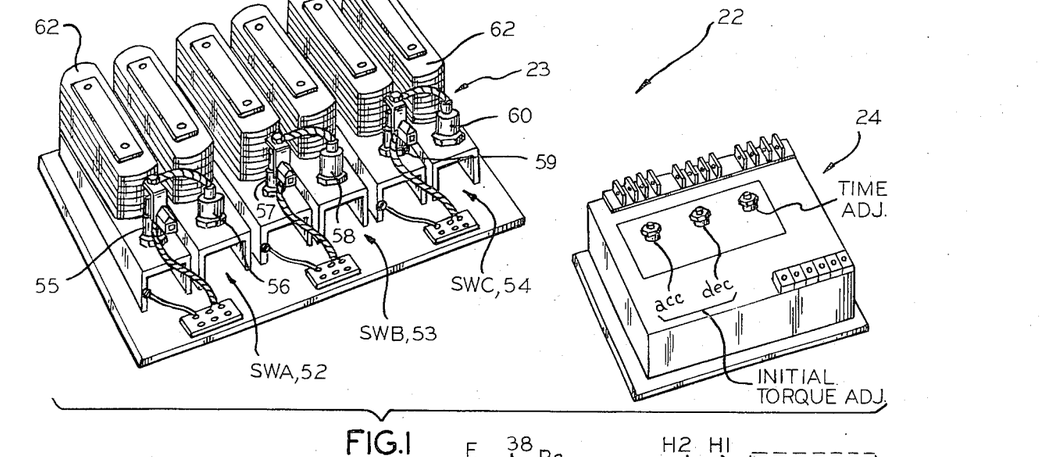
FIG. 1 is a perspective view of a power control system for controlling induction motors and embodying the principals of the invention.

The power control means 22 includes a three phase static switching network or bridge 23 and an operational control means 24 (FIG. 1). The operational means 24 is coupled to the input of the static switching network 23, to selectively control the electrical energy transferred by the three phase static switching network 23.

Figure 3:
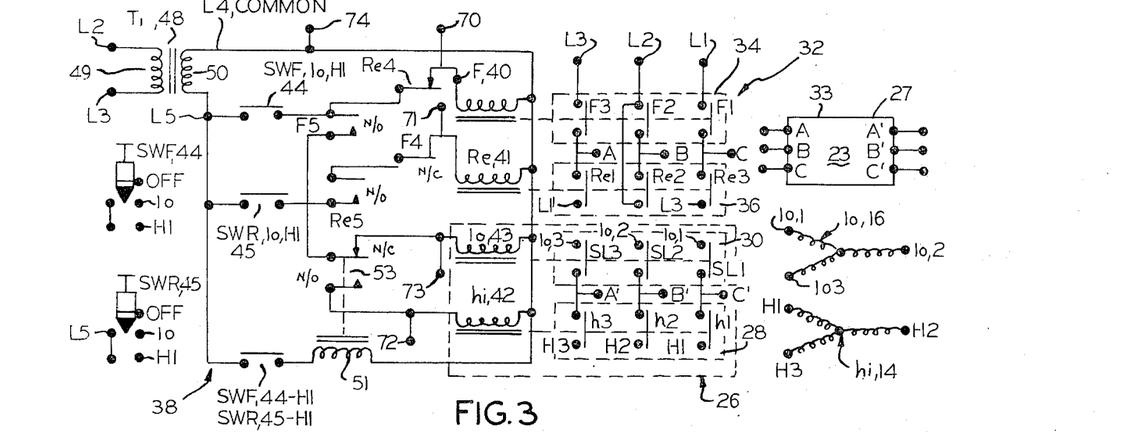
FIG. 3 is a schematic of the mechanical voltage and speed switches.

A speed contactor switch means indicated generally by the reference numeral 26 connects the output 27 of the switching network 23 to the motor means 12. The speed contactor switch means 26 includes a high (hi)-speed stator contactor 28 for connecting network 23 to the high speed stator 14, and a low (lo)-speed stator contactor 30 for connecting network 23 to the low speed stator 16 (FIG. 3).

An electrical voltage contactor means indicated generally by the reference numeral 32 connects the input 33 of the switching network 23 to the input power lines L1, L2 and L3 from the power source 20. The voltage contactor means 32 includes a forward voltage contactor switch means 34 for connecting lines L1, L2 and L3 in a forward or clockwise direction to the switching network 23, and a reverse voltage contactor switch means 36 for connecting the lines L1, L2 and L3 in a reverse or counter clockwise direction to the switching network 23.

The hi and lo speed contactors 28, 30 and the forward and reverse voltage contactors 34 and 36, each have an open (off) condition and a closed (on) condition.

A mechanical switch control indicated generally by the reference numeral 38 associates the voltage and speed contactor means 26 and 32 together, so that the forward voltage or reverse voltage sequence may be connected to either the high speed or low speed stators 14 and 16. The control 38 may be operated manually or programmed for automatic operation.

BRIEF DESCRIPTION OF OPERATION

After initially starting system 10, for example, in the forward voltage sequence and in the high speed mode, the forward voltage contactor 34 and high speed stator contactor 28 switch from the off-condition to the on-condition. The three phase AC voltages from lines L1, L2 and L3 are connected to the input 33 of the static switching network 23, and the high speed stator winding 14 is connected to the output 27 of the network 23.

Prior to the transfer of power from the input 33 to the output 27 of the switching network 23 there is a delay period during such delay the forward voltage contactor 34 and the hi-speed contactor 28 make physical contact, for connecting respectively the power source 20 with the input 33 of the switching network 23 and the high speed stator 14 with the output 27 of the switching network. At the end of the delay, the time period of energy transfer progressively increases through the network 23 from an initial minimum time period for a first AC current cycle to a greater time period for successive AC cycles until the motor operates at full high speed.

After the full high speed is reached, and system 10 is switched from the high speed mode to the low speed mode, the hi-speed contactor 28 switches from the on-condition to the off-condition, which causes a disable signal to be generated. The disable signal prevents current conduction through the static switching network 23, prior to the hi-speed contactor 28 breaking its connection with the system.

When the lo-speed contactor 30 switches from the off to the on-condition to connect the low speed stator 16 with the output 27 of the static switching network 23, a start signal is generated which also starts the running of a delay time period prior to energy transfer. During such delay, the lo-speed contactor 30 makes the physical connection between the switching network 23 and the low speed stator winding 16. At the end of the delay, the time period for energy transfer per AC current cycle is maintained at a preset minimum for a predetermined time duration, and thereby applying a minimum counter torque as the motor starts decelerating from the high speed to the low speed. At the end of such minimum energy time duration, the period per cycle of energy transfer to the motor is progressively increased for successive AC current cycles until the motor operates at the full low speed.

CONTACTOR MEANS

Turning now more specifically to FIGS. 2 and 3, it will be seen that the mechanical switching arrangement for the system 10 includes the three phase speed contactor means 26, the three phase voltage contactor 32 and the control 38 for associating the contactors 26 and 32 together.

The voltage contactor means 32 comprises the forward switch means 34 and the reverse switch means 36. The forward switch means 34 includes a solenoid F,40 for switching line switches F1, F2 and F3 and control switches F4 and F5. The line switches F1, F2 and F3 connect the power lines L1, L2 and L3 to the input 33 of the switching network 23 in the forward direction.

The reverse switch means 36 includes a solenoid Re,41 for switching line switches Re1, Re2 and Re3 and control switches Re4 and Re5. Line switches Re1, Re2 and Re3 connect the power lines L3, L2 and L1 to the switching network 23 in the reverse direction.

The speed contactor means 26 comprises the high speed contactor means 28 and the low speed contactor means 30. The high speed contactor means 28 includes a solenoid hi, 42 for switching line switches h1, h2 and h3, to connect the output 27 of the switching network 23 with points H1, H2 and H3 of the high speed stator winding hi,14.

The low speed contactor means 30 includes a solenoid lo,43 for switching line switches SL1, SL2 and SL3 to connect the output 27 of the switching network 23 with points lo1, lo2, and lo3 of the low speed stator winding lo,16.

The switch control 38 includes a forward switch SWF,44 and a reverse switch SWR,45. The energizing and de-energizing of the solenoids 40, 41, 42 and 43 are controlled by the forward and reverse switches 44 and 45, each having an off-position, a low (lo)-position, and a high (hi)-position. Switches 44 and 45 are shown as manual depressible switches, but their operation may be programmed for automatic operation.

The AC power for the solenoids are provided by transformer T1, having a primary 49 connected to power lines L2 and L3, and a secondary 50 having one end connected to a line L4 (a common line) connected to one side of each of the solenoids 40, 41, 42 and 43, and the other end of secondary 50 is connected to one side of the forward and reverse switches SWF,44 and SWR,45 in both the lo and hi-positions.

A relay 51 controlling a switch 53, switches between the low and high speed solenoids 43, and 42. Relay 51 is shown in FIG. 2 de-energized and normally connecting the low speed solenoid to the forward and reverse control switches F5 and Re5. Relay 51 switches to the high speed solenoid 42 when either switch SWF,44 or SWR,45 is switched to the Hi-position.

In operation when the forward switch SWF,44 is depressed to the lo-position, solenoid coil F,40 is energized; line switches F1, F2 and F3 close to connect lines L1, L2 and L3 to the input 33 of the switching network 23; switch F4 opens to prevent the reverse coil Re,41 from energizing; and switch F5 closes to connect AC line L5 to the low speed coil lo,43 via the normally closed (N/C) position (un-energized position) of relay 51. The low speed coil 43 is then energized which closes line switches SL,1 SL2, and SL3 to connect the output 27 of network 23 with the low speed stator lo,16 by connecting A', B' and C' respectively to stator points lo1, lo2 and lo3.

When the reverse switch SWR,45 is depressed to the lo-position, solenoid coil Re,41 is energized; line switches Re1, Re2 and Re3 close to connect lines L1, L2 and L3 to the input 33 of the switching network 23; switch Re4 opens to prevent the forward coil F,40 from energizing; and switch Re5 closes to connect AC line L5 to the low speed coil lo,43 via the normally closed (N/C) position of relay 51. When the low speed coil 43 is energized, the low speed stator lo,16 is connected to the output 27 of the switching network 23 by connecting A', B', C' with stator points lo1, lo2 and lo3.

When the forward switch SWF,44 is depressed to the Hi-position, the forward coil F,40 remains energized. In the Hi-position, AC voltage from line L5 is connected to relay 51. When relay 51 energizes, switch 53 switches position from its connection with the low speed coil 43, for connecting line L5 to the high speed coil 42 via the forward control switch F5 and the forward switch SWF,44. The low speed coil 43 de-energizes and the high speed coil 42 energizes for connecting the output 27 of the switching network to the high speed stator hi,14 by connecting A' B' and C' to stator points H1, H2 and H3. Similarly, when the reverse switch SWR,45 is depressed to the high-position, the reverse coil Re,41 remains energized, and relay 51 is energized to switch the switch 53 from the low speed coil 43 to the high speed coil 42, for connecting the outputs A', B' and C' of the switching network 23 with the points H1, H2 and H3 of the high speed stator hi,14. Therefore, when switching between high and low, with the forward or reverse switches SWF,44 and SWR,45, the corresponding forward or reverse solenoid coil 40 or 41 remains energized and relay 51 is energized or de-energized.

MOTOR

The motor means 12 comprises the low speed stator lo,16 and the high speed stator hi,14 for driving the rotor 18. As shown in FIG. 3, the stator coils 14 and 16 are connected in wye a Y configuration, but other configurations such as a delta, may also be suitable.

The motor control system 10 provides forward and reverse phase rotation to the motor means 12, at either the high speed or the low speed. By phase controlling the voltage to the induction motor 12, increments of line power at a controlled time rate are fed to the motor means, in order to provide the energy required to reach "full" torque at the corresponding speed. Although the description herein refers to a two speed motor, the system 10 may be used to drive an induction motor having more than two speed windings. Moreover, the system 10 may drive a plurality of multi-speed induction motors.

SWITCHING NETWORK

Figure 4:
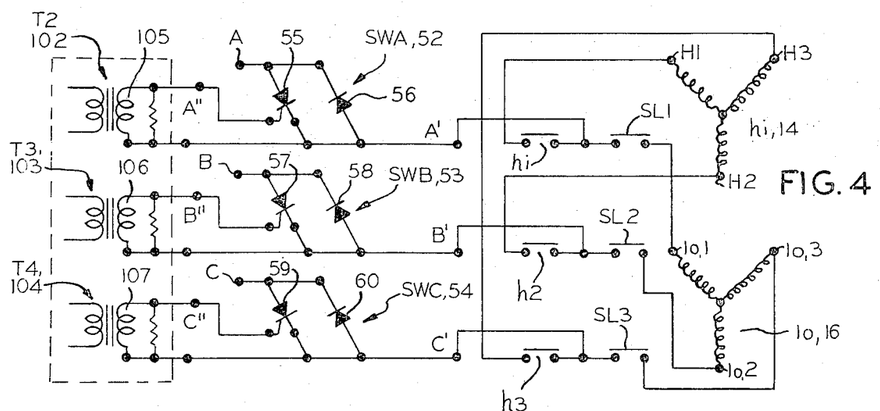
FIG. 4 is a schematic of the static switching network and associated circuitry.

The switching network 23, as may be seen from FIG. 4, comprises three static switches, A,52, B,53 and C,54. The sequence for switching the switches from an off-condition to a conduction condition, determines the phase of the power appearing at output terminals A', B', and C' of the switching network 23 and thus determines the rotational direction of motor means 12 in either the high speed or the low speed. Although various types of static switches are suitable, a thyristor and diode combination connected in parallel is used in the illustrated embodiment. Current flow is controlled by the firing of the thyristors and the current return is provided by the diodes. For greater output power requirements, a pair of thyristors may be more suitable. A thyristor is also commonly referred to as a silicon controlled rectifier (SCR).

Static switch A,52, includes thyristor 55 and diode 56 connected between input terminal A and output terminal A'; static switch B,53 includes thyristor 57 and diode 58 connected between input terminal B and output terminal B'; and static switch C,54 includes thyristor 59 and diode 60 connected between input terminal C' and output terminal C'. As shown the cathode of the diode is connected to the anode of the SCR, and the anode of the diode is connected to the cathode of the SCR. Heat is dissipated from the thyristors and diodes by the heat sinks 62 (FIG. 1).

Upon activating the forward or reverse switches SWF,44 or SWR,45, the power lines L1, L2 and L3 are connected to points A, B and C via the voltage contactor means 32, and upon firing of the static switches 52, 53 and 54, electrical connections are made with points A', B' and C'. Points A', B' and C' via the speed contactor means 26 are connected to one end of the three coils comprising the wye, Y, high speed and low speed stators hi,14 and lo,16.

The three phase power transferred through the static switches 52, 53 and 54 provide a half wave motor control system.

Only one thyristor switch may be turned on at any one time. When the thyristor 55 of static switch A,52 is fired into conduction, the positive portion of the sinusoidal current wave form passes from points A to A', then through the coils of the selected stator winding lo,16 or hi,14 and finally returns to the AC power source via diode 57 and/or diode 60, depending upon the voltage drop between the point A and points B and C during the conduction period of thyristor 55. Similarly, the current passes through thyristors 57 and 59 when these thyristors are in conduction. The negative portions of the input sinusoidal current wave forms turn the thyristors off.

FUNCTION GENERATOR MEANS

Figure 5:
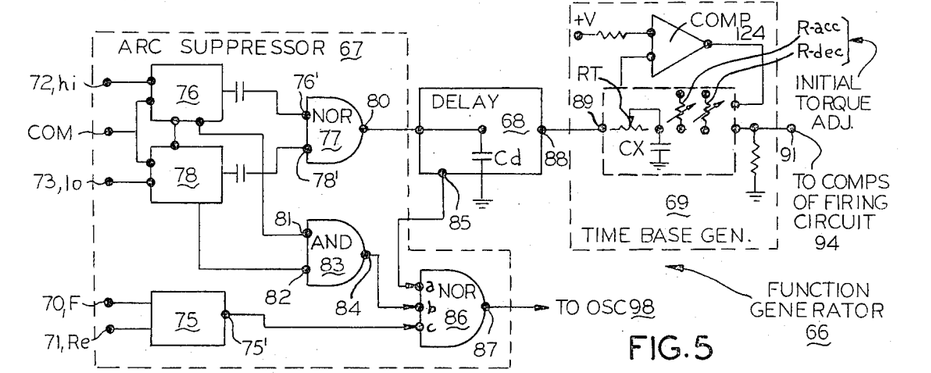
FIG. 5 is a block diagram of the function generator means.

Referring now more specifically to FIGS. 3 and 5, the operation of the function generator means 66 will now be described generally. The function generator means 66 comprises a break-make arc suppression means 67, a delay means 68 and a time base generator 69.

The non-common side of the contactor solenoid coils 40, 41 42 and 43 are connected respectively to input points 70, 71, 72 and 73 to the arc suppressor means 67 (FIG. 5). The common side of these coils are connected to input point 74.

Inputs 70 and 71 from the forward and reverse voltage coils 40, 41 are connected to a voltage logic switch 75 to provide an inhibit signal at the output 75' when either the forward or reverse coils 40, 41 is energized or de-energized. The inhibit signal prevents firing of the thyristor switches before the forward or reverse contactor switches 34 or 36 make or break their connection with source 20 and input 33 of the switching network 23.

Input 72 from the high speed coil 42 is connected to a high speed logic switch 76 to provide a logic 1 switch pulse at the input 76' to a NOR gate 77 when the hi-coil 42 is energized. Similarly, input 73 from the low speed coil 43 is connected to a low speed logic switch 78 to provide a logic 1 switch pulse at the input 78' to the NOR gate 77 when the low speed coil 43 is energized.

Figures 7, 8:
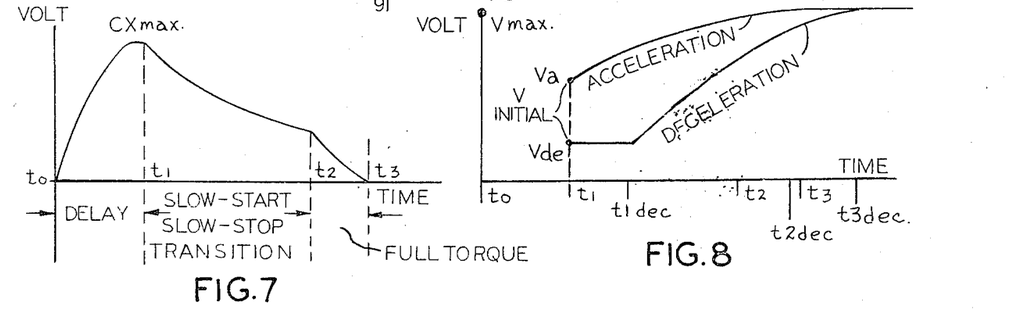
FIG. 7 is a curve of voltage versus time of the output function signal generated by the function generator.
FIG. 8 is a curve of voltage versus time of the motor means when the motor is accelerating or decelerating.

The NOR gate 77 switches from 1 to 0 state (+ V to ground) in response to the logic pulse from logic switch 76 or 78, to cause capacitor Cd of the delay means 68 to discharge; the effect of which, is to generate a delay start signal to cause the forming of that portion of the function signal shown in FIG. 7 between time $t0$ and $t1$.

Logic switches 76. 78 also 76, respectively logic 1 signals at inputs 81 and 82 to an AND gate 83 when neither of the speed solenoid coils 42 or 43 is energized, as may occur during the transition when switching from one speed mode to the other; or when the coils are simultaneously in an energized state, which may also occur during the transition when switching between speeds. The AND gate 83 changes state in response to the logic 1 signals, to provide an inhibit signal to prevent firing of the thyristor switches 52, 53 and 54.

The delay circuit 68 includes an output 85 which generates another inhibit signal after NOR gate 77 changes from a 1 to a 0 state at time $t0$ in FIG. 7, and capacitor Cd discharges, to also prevent firing of the thyristor switches during the delay period between time $t0$ to $t1$. At time $t1$, Capacitor Cd has recharged and the inhibit signal at output 85 is removed.

The output 85 from the delay means 68, the output 75' from the forward-reverse voltage logic switch 75; and outout 84 from AND gate 83 are connected respectively to inputs a, b and c of a NOR gate 86. When output 87 of the NOR gate 86 switches from a 1 to an inhibit 0 state in response to any of the inputs being at a logic 1, the thyristor switches are prevented from firing into conduction. Thus, during the time delay period ($t0$ to $t1$ in FIGS. 7 and 8); or when the hi or lo solenoid coils 42 or 43 is being de-energized; or when the forward or reverse coils 40, 41 is being de-energized, energy transfer through the switching network 23 is prevented. The time delay in the delay means 68 prevents firing of the thyristor switches 52, 53 and 54 prior to the speed or voltage contactors 26, 32 making contact; and the timing provided in the forward and reverse voltage logic switch 75 inhibits firing of the thyristor switches 52, 53 and 54 prior to the speed or voltage contactors breaking contact from either the HI or lo-position to the off-position; and the timing provided in the logic switches 76 and 78 prevent firing of the thyristor switches 52, 53 and 54 prior to the speed contactors 26 breaking contact.

Therefore, the mechanical contactor make-arc suppression is provided by the output 85 of delay 68 connected to a point a of NOR gate 86; and the break arc suppression is provided either by the output 75' of logic switch 75 when switching from HI or lo speed to off, or output 84 of AND gate 83 when switching between HI and lo speed.

The output 88 from the delay means 68 is connected to input 89 of the time base generator 69. The delay start signal caused when capacitor Cd of the delay means 68 discharges, is applied to input 89 at time $t0$, which, in turn, causes capacitor CX to charge to its maximum voltage level between the time $t0$ and $t1$.

When capacitor Cd has recharged, a function start signal is then applied to input 89 at time $t1$, and simultaneously the inhibit logic 1 signal at output 85 is removed, and system 10 is ready to transfer energy. During time $t1$ to $t3$, capacitor CX which was charged during the delay period ($t0$ to $t1$), starts to discharge and the function signal appearing at output 91 decays as shown in FIG. 7.

The output 91 from the time base generator 69 is connected to the firing circuit 64 for applying the function signal thereto. The decaying function signal at output 91 causes the time increment for energy transfer per AC cycle to progressively increase from a minimum time increment at time $t1$ to a maximum time increment of energy transfer per AC cycle at time $t3$, as the thyristor switches 52, 53 and 54 (FIG. 4) sequentially turn on and off in a phase relationship. It should be noted that the thyristor switches are prevented from firing until the mechanical line contactors 26, 32 have made actual contact and NOR gate 86 has switched back to the logic 1 state from the inhibit 0 state.

The time base generator 69 includes three primary variable controls: a variable resistor means RT, which may be used for varying the time for discharging capacitor CX between time $t1$ and $t2$, thereby setting the real time between $t1$ and $t2$; an acceleration variable resistor Racc for adjusting the initial voltage level (initial acceleration torque) of the function signal at output 91, when the motor 12 begins to accelerate after being switched from the off to the high speed or low speed mode, or after being switched from the low speed to the high speed; and a deceleration variable resistor Rde, for adjusting the initial voltage level (initial deceleration torque) of the function signal at output 91, when the motor 12 begins to decelerate after being switched from the high speed to the low speed.

FIRING CIRCUIT

Figure 6:
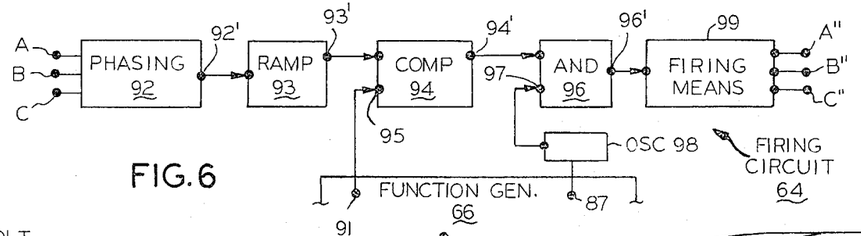
FIG. 6 is a block diagram of the firing circuit.

With particular reference to FIG. 6, the firing circuit 64 is shown including a phasing network 92 having input points connected to voltage inputs A, B and C to the switching network 23. The output 92' is connected to ramp a network 93 having an output 93' connected to a comparator network 94. Another input 95 receives the function generator signal from output point 91 from the time base generator 69. The output 94' from the comparator network 94 is connected to AND gate network 96. Another input 97 receives a base signal from a time base oscillator 98. The oscillator 98 is also connected to output 87 of the NOR gate 86 of the arc suppressor 67. The output 96' from the AND gate 96 is connected to a firing means 99.

The firing means 99 includes output transformers T2,102, T3,103 and T4,104 connected to the switching network 23. Turning to FIG. 4, it will be seen that the secondary 105 of T2 is connected between points A" and A' of switch SWA52; and secondary 106 of T3 is connected between points B" and B' of switch SWB,53; and secondary 107 of T4 is connected between points C" and C' of switch SWC54.

The phasing, ramp, comparator, and AND networks 92, 93, 94 and 96 and the firing means 99 may comprise the component parts as disclosed in my aforesaid prior patent application. The following briefly describes the operation of the firing circuit 64 when used with three phase electrical power as illustrated herein.

The phasing network 92 is connected to the switching network 23 and includes three sections (not shown); one section having inputs connected to points A and B; a second section connected to points B and C; and a third section connected to points C and A. The output 92' of the phasing network provide square wave signals corresponding to the positive portion of the input AC phase voltages (A, B and C square waves), and square waves corresponding to the negative portion of the input AC phase voltages ($\bar{A}$, $\bar{B}$ and $\bar{C}$ square waves).

The ramp network 93 includes three sections (not shown) which are selectively connected to the outputs of the phasing network 92 to provide three ramp signals, 120° out of phase from each other, and the time period of each ramp signal is 120°. Due to the phase variation of the ramp signals, only one thyristor switch SWA, SWB or SWC (FIG. 4) at any specific time, is biased into the conduction condition. The magnitude of energy transferred per cycle to each phase of the motor means is independent of the phasing of the input power at points A, B and C, but the sequence of firing of the thyristor switches is responsive to such phasing.

The comparator network 94 includes three comparator sections (not shown) having a pair of inputs per comparator. Each comparator corresponds to one of the three phases, and each comparator has one input connected to one of the ramp sections and the other input is provided by output 91 of the time base generator 69 of the function generator 66 for applying thereto, the time varying function signal (FIG. 7). The comparators compare the corresponding phase ramp signals with the time varying function signal which decreases in magnitude between time $t1$ and $t3$ (FIG. 7). Since each ramp signal is 120° out of phase from the other, only one ramp signal is being compared at one time and for a period of 120° of the corresponding phase voltage. If the function signal is greater than the corresponding ramp signal, no output signal appears at the corresponding comparator outputs at 94'. If the ramp signal is equal to or greater than the function signal, an output is generated. Thus, when the function signal is at a maximum (time $t1$ in FIG. 7), the comparator network 94 provides signals which cause energy transfer through network 23 for the shortest time duration. When the function signal is near zero (time $t3$ in FIG. 7), the comparator network 94 provides output signals which cause energy transfer through network 23 for the longest time duration.

The AND network 96 includes three AND gates sections (not shown) having a pair of inputs per AND gate. One input to each AND gate is connected to an output of one of the comparators, and the other input to each AND gate is connected from the time base oscillator 98. Oscillator 98 is cut off when the NOR gate 86 has switched to an inhibit 0 signal. The AND gates provide a time series of pulses generated by oscillator 98 for the firing means 99, which cause the thyristor switches 52, 53 and 54 to sequentially fire when the AND network 96 is on; and the thyristor switches are turned off by the negative position of the corresponding AC phase current wave.

ARC SUPPRESSION

Arc suppressor 67 includes the logic switches 75, 76 and 78 for sensing the energizing and de-energizing of the solenoid coils 40, 41, 42 and 43. Logic switches 76 and 78 are connected to input b of NOR gate 86 via AND gate 83 and logic switch 75 is connected to input c of NOR gate 86. The delay circuit 68 is connected to input a of the gate 86. Upon receiving a logic 1 at either inputs a, b or c, the output 87 of NOR gate 86 switches to an inhibit 0 state, to turn off the time base oscillator 98, which prevents the firing of the SCRs 52, 53 and 54. The NOR gate 86 remains in the inhibit 0 state until after the mechanical contactors 26 and 32 make and/or break contact with the system.

Figure 9:
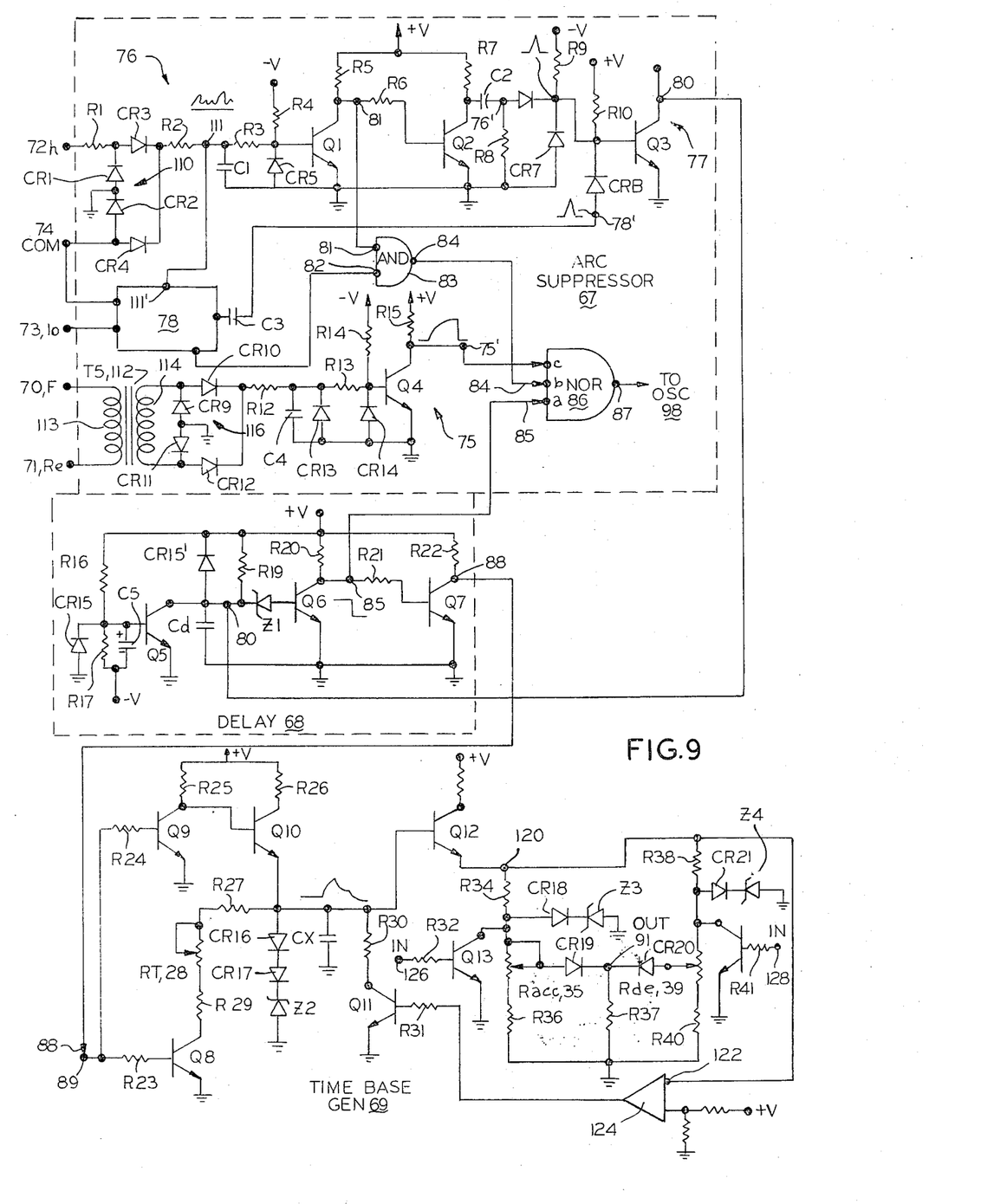
FIG. 9 is schematic of the arc suppression, the delay circuit and the time base generator of the function generator.

Turning now more specifically to FIG. 9, the circuitry for the arc suppressor 67 will be described in more detail. Logic switch 76 includes a full wave bridge identified generally by numeral 110 and comprises back to back diodes pairs CR1 and CR3, and CR2 and CR4. NPN transistor Q1 is off when there is no energizing signal from the hi-coil 42. Q1 is DC coupled to NPN transistor Q2 which is on when Q1 is off. Q2 is AC coupled via capacitor C2 to NPN transistor Q3, to pass a positive pulse via diode CR6 to the base of Q3 when Q2 is turned off. Therefore, to turn Q3 (NOR gate 77) on, the energizing of the hi-coil is sensed, which causes the bridge 110 to develop a DC voltage at point 111, which turns Q1 on, and Q2 off; and the positive pulse generated by Q2 switches Q3 on.

Logic switch 78 operates similarly as logic switch 76, except it generates a negative DC at point 111' to switch on a PNP transistor (not shown). An additional inverter switch stage (not shown) is required to provide the positive pulse for turning on Q3, NOR gate 77. Note, that in the event coils 42, 43 were both energized, the positive and negative DC developed at points 111 and 111' would cancel, and no pulse would be generated to turn on Q3.

Logic switch 75 includes a transformer T5, 112 having a primary side 113 and a secondary side 114. The primary 113 is connected on one end via resistor R11 to input point 70,F from the forward solenoid coil 40, and connected on the opposite end to input point 71,Re from the reverse solenoid coil 41. A full wave bridge identified 116 is connected to the secondary 114 to develope a positive DC voltage when the forward or reverse coil 40 or 41 is being energized for turning on NPN transistor Q4. An inihibt signal is present at Q4, point 75', when Q4 is off.

The collector of Q1, also point 81, is connected to the input of AND gate 83. Point 82 from the low speed logic switch 78 is also connected to the AND gate 83 (and may also be taken from a collector of a transistor which is normally off to provide a logic 1 signal except when the energizing signal from the low speed coil 41 is present). The output 84 of AND gate 83 provides a logic 1 state when no energizing signal appears at either speed input points 72 or 73. AND gate 83 enables arc suppression on the break of the mechanical speed contactors 34, 36.

The ouput 84 of AND gate 83 is connected to point b of NOR gate 86. The output point 75' from Q4 of the voltage logic switch 75 is connected to input c of NOR gate 86. An output 85 from the delay 68 is connected to input a of the NOR gate 86. When any one of the inputs a, b or c of NOR gate 86 is a logic 1 or a + V voltage, the NOR gate 86 switches to a 0 inhibit state, to prevent the time base oscillator 98 from oscillating and the thyristor switches 52, 53 and 54 from firing.

When starting the system 10 from the off-position to a selected speed, the collector of Q4 of the forward-reverse voltage logic switch 75 is at logic 1 until capacitor C4 charges sufficiently to turn on Q4, which occurs after the voltage contactor 32 makes connection with the system. This logic 1 signal switches NOR gate 86, to disable the ocillator 98 and prevent the SCR switches 52, 53 and 54 from firing – thereby providing make arc suppression for the voltage contactor means 32.

When switching system 10 from a speed position to the off-position, the loss of the energizing voltage causes the capacitor C4 of the voltage logic switch 75 to discharge through Q4 until Q4 cuts off to provide a logic 1 signal prior to the mechanical voltage contactor 32 breaking connection with the system 10. This logic 1 signal switches NOR gate 86 to disable the oscillator 98 – thereby providing break arc suppression for the contactor means 26 and 32.

When switching system 10 from one speed mode to another, the sensing of the energizing of one of the speed solenoid coils 40 or 41 causes the NOR gate 77 to switch to a zero state, and in response output 85 of the delay circuit 68 generates a logic 1 signal to switch NOR gate 86 and disable oscillator 98 – thereby providing make arc suppression for the speed contactor means 26.

Also, when switching from one speed mode to another, the AND gate 83 detects the loss of energizing voltage from the hi-or low speed solenoid coils, and flips to a logic 1 at the output 84, causing NOR gate 86 to switch and disable oscillator 98 – thereby providing break arc suppression for the speed contactor means 26.

DELAY

The delay circuit 68 includes an NPN transistor 65 coupled from the collector to the base of NPN transistor Q6 via a zener diode Z1. When power is initially applied to system 10, NPN transistors Q5 and Q6 are normally on. Capacitor Cd charges to a voltage substantially the sum of the zener voltage of Z1 and the base-emitter voltage of Q6. Q6 is DC coupled to NPN transistor Q7 which is cut off. The collector of Q7 which is point 88, is connected to the input 89 of the time base generator 69. When either the high or low speed coil 42 or 43 is energized the output 80 of NOR gate 77 switches from a 1 to a 0 state causing capacitor Cd to quickly discharge, which in turn, cuts off Q6 and turns on Q7. The collector of Q7 point 88, connects a start-delay signal to the time base generator 69, and the collector of Q6, which is point 85, applies an inhibit logic 1 pulse to input a of NOR gate 86 to switch the NOR gate and disable oscillator 98.

Now capacitor Cd starts charging between time $t0$ and $t1$, which is the delay period, prior to permitting energy transfer to the motor 12. During the delay period, CX charges to the maximum set voltage as shown in FIG. 7. At time $t1$, capacitor Cd has charged to a voltage sufficient to overcome the zener voltage and turn on Q6, which causes Q7 to cut-off. Now a start-function signal is connected to the input of the time base generator 69. The oscillator 98 starts to operate since the inhibit signal from point 85 is removed when Q6 is on, and the energy transfers through the switching network begins.

TIME BASE GENERATOR

The time base generator 69 generates the time varying function signal shown in FIG. 7, which determines the magnitude of the period of current conduction per cycle, the voltage per cycle being impressed across the motor winding by the energy transfer through switching network 23, and the speed of acceleration or deceleraton until reaching the selected full speed or zero speed.

The time base generator 69 includes a pair of input NPN transistors Q8 and Q9 connected to the input point 89 respectively via resistors R23 and R24. Q9 is DC coupled to NPN transistor Q10 which is normally cut-off.

The capacitor CX is connected between ground and point 118. Capacitor CX is connected to the emitter of Q10; to the collector of Q8 via resistor R27 variable resistor RT,28 (time adj.) and R29; to the collector of NPN transistor Q11 via resistor R30; to the base of NPN emitter follower transistor Q12; and the series connection of diodes CR16 and CR17 and zener diode Z2.

Capacitor CX charges to a voltage substantially equal to the forward voltage drop through diodes CR16 and 17 and the zener voltage across the zener diode Z2 from a charge path from +V through R26 and Q10. CX charges between time $t0$ and $t1$. CX discharges between time $t1$ and $t2$ via R27, variable RT, R28, R29 and Q8 to provide a slow discharge, and discharges between time $t2$ and $t3$ via R30 and Q11 to provide a quick discharge.

The emitter at point 120 of emitter following Q12 is connected to one end of resistors R34 and R38 and an input 122 to a comparator 124. The opposite end of resistor R34 is connected to NPN transistor Q13, variable resistor Racc,35 and the series connection of diode CR18 and zener diode Z3; and the opposite end of resistor R38 is connected to NPN transistor Q14, variable resistor Rde,39 and the series connection of diode CR21 and zener diode Z4.

Variable resistor Racc,35 provides adjustment of the initial torque when the motor 12 starts accelerating upon being switched into high or low speed from the off-position or switched into high speed from the low speed. Variable resistor Rde,39 provides adjustment of the initial torque when the system 10 decelerates upon being switched into the low speed from the high speed.

The comparator 124 provides a logic 1 signal for switching Q11 on at time $t2$ when the voltage at input 122 from point 120 reaches a predetermined level.

When Q11 is on, the rate of discharge of CX is substantially increased and thereby increase the rate of decay of the function signal between time t2 and t3, as may be seen by referring again to FIG. 7.

The output 91 of the time base generator 69 is connected to R37 and diodes CR19 and CR20. When the motor 12 is decelerating, a logic 1 signal is applied to input point 126 to turn on Q13 and nullify the effect of the acceleration initial torque adjustment of Racc. Similarly, when the motor is accelerating a logic 1 signal is applied to input point 128 to turn on Q14 and thereby nullify the effect of the deceleration initial torque adjustment Rde.

TIMER

Figure 10:
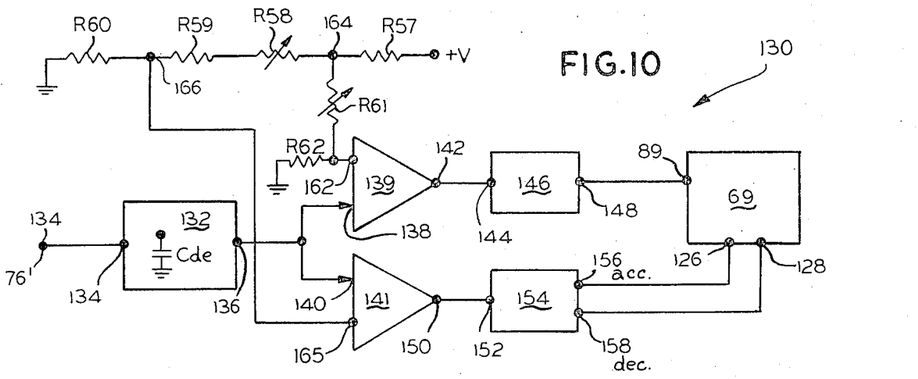
FIG. 10 is a block diagram of a deceleration timer network used when the system switches from the high speed mode to the low speed mode and also illustrating an initial torque switch.
Figure 11:
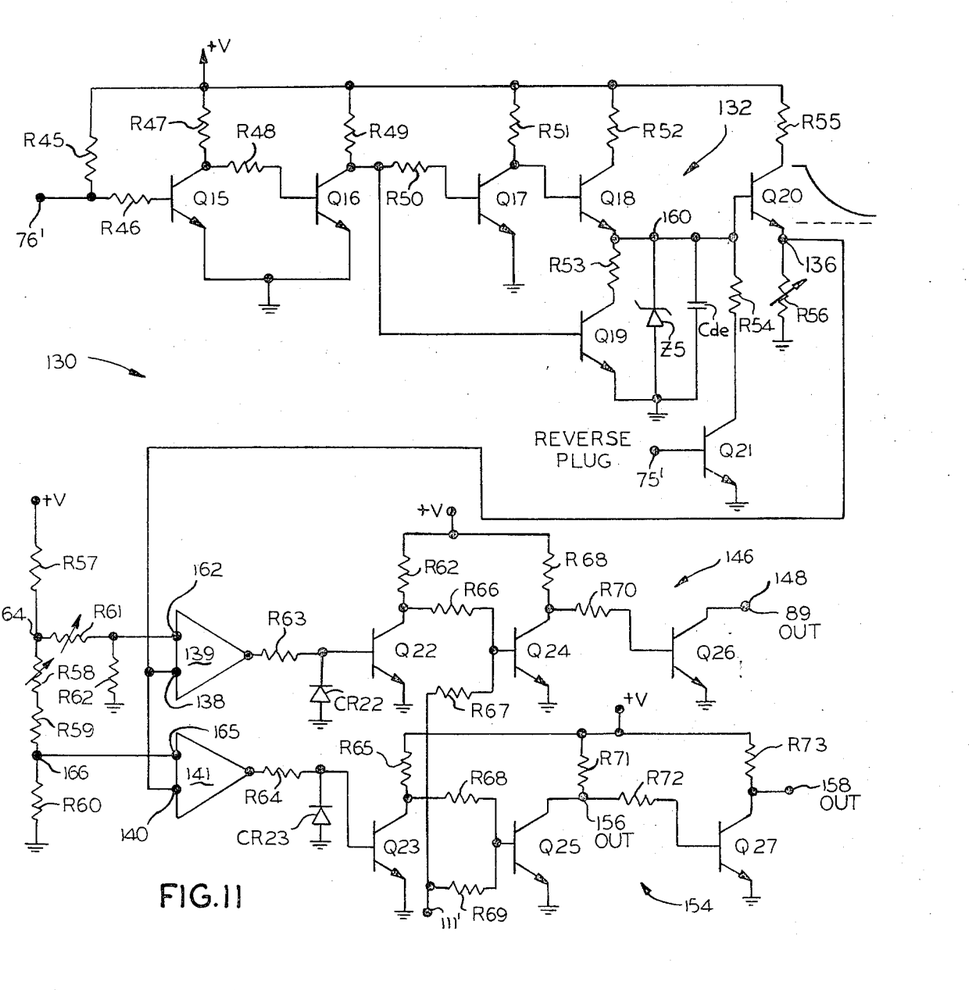
FIG. 11 is a schematic of the timer and torque switch in FIG. 10.

Turning now more specifically to FIGS. 10 and 11, a deceleration timer means indicated generally by the reference numeral 130 will be described. Timer 130 controls the period per cycle of energy through the switching network 23 when the motor means 12 initially decelerates, after being switched from the high speed mode to the low speed mode.

The timer 130 comprises a minimum energy time generator 132, which charges capacitor Cde when the motor means 12 is operating in high speed. When the motor means decelerates toward the low speed, after being switched from the high speed to the low speed, energy is initially transferred through the switching network 23 at a minimum time period per AC cycle, for an initial time interval determined by the rate of discharge of capacitor Cde. When capacitor Cde discharges to a predetermined voltage level, the system 10 then causes the time period for energy transfer per cycle to progressively increase until the motor 12 reaches full low speed. In this manner, the transition between high speed and low speed may be accomplished softly and smoothly and without creating any harmful jarring or vibrations.

The input 134 of the time generator 132 is connected to point 76' of the high speed logic switch 76 to receive a logic 0 signal to cause Cde to charge, when the motor is at the high speed. The output 136 is connected respectively to input 138 of comparator 139 and input 140 of comparator 141.

The output 142 of comparator 139 is connected to input 144 of a hold network 146 having an output 148 connected to input 89 of the time base generator 69. The output 150 of comparator 141 is connected to the input 152 of an acceleration-deceleration initial torque switch 154.

The torque switch 154 includes an acceleration output 156 and a deceleration output 158 connected respectively to points 128 and 126 of the time base generator 69. When the motor 12 is decelerating between the high and low speed, the effect of the acceleration initial torque adjust Racc,35 is nullified, and when the motor is accelerating toward the high or low full speed, the deceleration initial torque adjust Rde,39 is nullified.

The minimum energy time generator 132 includes an NPN transistor Q15 which is on when the motor 12 is in low speed and off when the motor is in high speed. Q15 is DC coupled to NPN transistor Q16, which is DC coupled to Q17 and Q19. Q17 is DC coupled to Q18. Capacitor Cde is connected between point 160 and ground. Capacitor Cde is connected to zener diode Z5, resistor R53 and R54, the emitter of Q18 and the base of emitter follow NPN transistor Q20. As shown, the opposite end of R53 is connected to the collector of Q19 and the opposite end of R54 is connected to the collector of Q21.

In operation when the motor 12 is at high speed, a logic 0 appears at input 134 of the minimum energy time generator 134, from output 76' of the high speed logic switch 76. Therefore, Q15 is off, Q16 is on, Q17 and Q19 are cut off and Q18 is on. Now capacitor Cde charges to the value which is substantially the zener voltage of Z5. Now when the system switches into low speed a logic 1 appears at input 134, causing Q17, which previously provided a charge path for Cde, to turn off; and Q19 turns on to provide a discharge path for Cde.

The output 136 of the minimum energy time generator 132 is connected to inputs 138, 140 of comparators 139, 141. The other input 162 to comparator 139 is connected to variable resistor R61 and resistor R62. Resistor R61 is connected to the junction of resistor R57 and variable resistor R58 at point 164.

Resistors R57, R58, R59 and R60 form a voltage divider between +V and ground to set the reference level for the comparators 139, 141. The other input 165 of comparator 141 is connected to point 166 which is the junction of resistors R59 and R60. Point 164 on the divider is always at a greater voltage than point 166.

When the motor is initially switched into low speed Q22 is on, Q24 is off and Q26 is on, to provide a hold-voltage at point 89 of the time generator 69 to prevent capacitor CX from discharging from its maximum level; thereby causing minimum energy transfer through the switching network 23. After capacitor Cde discharges to a preset voltage after a predetermined time interval, comparator 139 changes state to cause Q26 to turn off, and thereby provide a logic 1 at point 89 which turns Q8 on. Capacitor CX now starts discharging and the energy transferred through the switching system 23 is progressively increased.

During the deceleration the NPN transistor Q25 is off to provide a logic 1 at point 126 of the time base generator to turn on Q13 and nullify the acceleration initial torque adjustment; Racc,35. NPN transistor Q26 is off, so that Q14 remains off and the deceleration adjust, Rde,38 controls the initial torque. During acceleration of the motor, the deceleration adjust, Rde,38 is nullified, and the acceleration adjust Racc,35 controls the initial torque.

The foregoing specification and description are intended as illustrative of the invention, the scope of which is defined in the following claims.

I claim:

1. In a motor control system including an alternating current (AC) voltage and current source, an AC motor means including a high speed stator winding and a low speed stator winding, and a power control means for controlling the power transferred from the source to the motor means, said power control means comprising:
   a power switching network having an input end and an output end for transferring electrical energy from the input to the output;
   a speed switch means having an on-position and an off-position, said speed switch means connecting either the high speed stator winding or the low speed stator winding with the output end of the switching network when in the on position;

an operational means for controlling said energy transfer; and voltage switch means having an on-position and an off-position for respectively connecting and disconnecting the AC voltage from said source to the input of the power switching network, said speed switch means including means for generating a start signal when switched from the off to the on-position after said voltage switch means is switched to the on-position, to cause the starting of said energy transfer.

2. The control system of claim 1, wherein said speed switch means includes:

means for cooperating with said operational means to generate a disable signal for preventing current conduction through said power switching network when switching from one speed winding to the other speed winding.

3. The control system of claim 2, wherein:

said speed switch means includes a low speed switch means and a high speed switch means for connecting respectively the low speed stator winding and the high speed stator winding to the output of the switching network, each of said speed windings having an on-position and an off-position, said disable signal being generated when switching from one speed winding to the other speed winding.

4. The control system of claim 2, wherein said voltage switch means includes means for generating a turn-off signal when switching from the on to the off condition for preventing said current transfer.

5. The control system of claim 4, wherein:

said voltage switch means includes a forward switch means and a reverse switch means for connecting said AC voltage respectively in the forward and reverse directions, said forward and reverse switch means each including an on-position and an off-position, said turn-off signal being generated when either said forward or reverse switches is switched from the off to the on-position.

6. The control system of claim 1, wherein said operational control means includes a function generator means comprising:

a time base generator means for progressively increasing the period of energy transfer per AC cycle through said power switching network after said speed contactor means connects one of said speed windings with the switching network.

7. The control system of claim 6 includes:

a minimum time generator means for cooperating with said time base generator to maintain the period of energy transfer through said network at said minimum period for a predetermined time interval prior to progressively increasing the period of energy transfer.

8. The control system of claim 7 includes:

means for preventing operation of said minimum time generator except after the motor is switched from high speed into low speed.

9. In a motor control system including an alternating current (AC) voltage and current source, an AC motor means and power control means for controlling the power transferred from the source to the motor means, said power control means comprising:

a power switching network having an input end and an output end for transferring electrical energy from the input to the output;

a load switch means having an on-position and an off-position, said load switch means connecting said motor means with the output end of the switching network when in the on-position;

voltage switch means having an on-position and an off-position for respectively connecting and disconnecting the AC voltage from said source to the input of the switching network, said load switch means including means for generating a start signal to cause the starting of said energy transfer when switched from the off to the on-position after said voltage switch means is switched to the on-position; and an operational control means connected to said switching network to cause the period for current conduction per cycle to increase progressively from an initial minimum time period to a maximum time period per cycle after said load switch has been switched to the on-position, said operational means including means for maintaining said conduction period per cycle substantially at said minimum time period per cycle for a predetermined time interval prior to causing said progressive increase in the conduction period per cycle.

10. The motor control system of claim 9, wherein said motor means includes a high speed mode and a low speed mode, and said means for maintaining the conduction period at said minimum for the predetermined time interval occurring only after the motor means is switched from the high speed mode to the low speed mode.

11. A method for controlling the operation of a motor means having a high speed winding and a low speed winding, comprising the steps of:

connecting AC current to an input;

causing electrical energy to be transferred from said input to one of said windings of the motor means;

switching the motor means from said one winding to the other winding;

generating a disable signal when switching from said one winding to the other winding to prevent said transfer of electrical energy; and progressively increasing the period of energy transfer per cycle of AC current transferred from said input to said other winding, from an initial time period per cycle to a greater time period per cycle, after the disable signal is removed.

12. The method of claim 11 includes:

delaying the transfer of energy for a delay interval after the disable signal is generated.

13. The method of claim 12 includes:

maintaining the time period per cycle at said initial period for a predetermined time interval; and progressively increasing the period of energy transfer per cycle after said time interval.

14. The method of claim 13 includes:

only maintaining said initial period of energy transfer for said time interval when switching from the high speed mode to the low speed mode.

15. In a motor control system including an alternating current (AC) voltage and current source, a high speed motor means and a low speed motor means for driving a load and a power control means for controlling the power transferred from the source to said motor means, said power control means comprising:

a power switching network having an input end and an output end for transferring electrical energy from the input to the output;

a speed switch means having an on-position and an off-position for associating and dis-associating either the high or the low speed motor means with the output of the switching network;

an operational means for controlling said energy transfer; and means for cooperating with said operational control for preventing energy transfer through said power switching network when said speed switch is switched from one position to the other position.

16. The system of claim 15, wherein said operational control means prevents said energy transfer for a delay interval after said speed switch is switched from an off to an on-position.

17. The system of claim 15, wherein said operational control means provides a disable signal to prevent energy transfer through the switching network when said speed switch is switched from the on to the off-position.

18. The system of claim 15, wherein an initial period of voltage transfer per voltage cycle through said switching network is maintained at a predetermined time interval per cycle, and after said initial period the period of voltage transfer per cycle is progressively increased until reaching a maximum period of voltage transfer per cycle.

19. The speed switch of claim 15, includes a high-speed switch and a low speed-switch, for connecting respectively the high speed motor means and the low speed motor means to the output of the switching network, the high and low speed switches each have an on-position and an off-position.

20. The motor control system of claim 19, wherein the high speed switch and the low speed switch are electromechanical switches having respectively a high speed energizing coil and a low speed energizing coil for causing the switching between said on and off positions, and said operational control means comprises:

means for preventing said energy transfer when both said high speed and low speed coils are energized 21. The motor control system of claim 19, wherein the high speed switch and the low speed are electromechanical switches having respectively a high speed energizing coil for causing switching between said positions and said operational control means includes:

means to prevent said energy transfer when the high speed coil is initially energized; and means to prevent said energy transfer when the low speed coil is initially energized.

22. The motor control system of claim 21, wherein said operational control means further includes:

delay means for preventing said energy transfer for a pre-determined delay time interval when said high speed coil or low speed coil is energized.

23. The motor control system of claim 22, wherein said delay means includes turn-on means for starting said energy transfer after said time delay interval.

24. The system of claim 19, wherein said operational control means includes:

means to prevent current conduction through said switching network when said high and low speed switch are in the off-position and electrical voltage is connected to the input of said switching network.

25. The system of claim 19, wherein said operational control means includes:

a delay capacitor means for discharging when either said high or low motor means is switched from the off to the on-position, said operational means providing an inhibit signal to prevent said energy transfer when said delay capacitor is discharged.

26. The control system of claim 15 includes:

a voltage switch means for connecting and disconnecting AC voltage to the input of said switching network, said operational control means including means for generating a disable signal for preventing current conduction through said switching network when said voltage switch means is switched from the on to the off-position.

27. The motor control system of claim 26, wherein said voltage switch means includes means for changing the phase of the electrical power transferred through said switching system to reverse the rotational direction of said motor means.

28. The motor control system of claim 26, wherein said voltage switch means is associated with said speed switch means, whereby said speed switch means connects one of said motor means to said output of the switching network when said voltage switch means is switched from an off to an on position.

29. The motor control system of claim 15 includes:

means for generating a turn-on signal after said speed switch means is switched from the off to the on-position, to cause the starting of said energy transfer.

30. The motor control system of claim 15, wherein said speed switch means comprises an electromechanical switch means including a line switch, said line switch connecting and disconnecting the high or low speed motor means from the output of said switching network, and said means for preventing energy transfer includes:

a make-arc suppression means for causing a disabling signal to be generated for preventing energy transfer through said switching network for a time delay interval so that said electromechanical switch means connects said output of the switching networks with one of said motor means during said delay interval.

31. The motor control system of claim 30, includes:

an electromechanical voltage switch means including a line switch for connecting a voltage from an electrical source to the input of said switching network, said means for preventing energy transfer includes a break-arc suppressor means for causing said disabling signal to be generated for preventing electrical energy transfer through said switching network prior to the line switch of the voltage switch means disconnecting said input of the switching network from said source.

32. The motor control system of claim 15, wherein said speed switch means comprises an electromechanical switch means including a line switch for connecting and disconnecting the high or low speed motor means from the output of the switching network, and said means for preventing energy transfer includes:

a break-arc suppression means for causing a disabling signal to be generated for preventing electrical energy transfer through said switching network prior to said line switch disconnecting said output of the switching network from one of said motor means.

33. The motor control system of claim 15, wherein said electrical energy transfer is progressively increased from an initial time period per AC cycle to a greater time period per cycle.

34. The system of claim 33, wherein said operational control means includes:
means for generating a voltage varying signal, the rate of decay of said voltage varying signal determining the rate the period of energy transferred per AC cycle from the input to the output of said switching network is progressively increased.

35. The system of claim 34 wherein the means for generating a voltage varying signal includes:
a function capacitor means, said function capacitor means being charged after said speed switch is switched from the off-position to the on-position and prior to said transfer of energy, the discharge of said function capacitor causing said period of energy transfer per cycle to increase.

36. The system of claim 33, wherein said operational control means includes:
a minimum energy timer means for maintaining the period of energy transfer per cycle at a predetermined minimum for a predetermined time interval, the transfer of said energy progressively increasing after said time interval.

37. The system of claim 36, wherein said operational control includes:
means to prevent transfer of said minimum energy for said time interval when said system is initially connected to the low speed motor means.

38. The system of claim 36, wherein said minimum energy timer means includes:
a capacitive means for discharging to a predetermined voltage level during said time interval, said progressive increase in energy transfer occurring after said capacitive means reaches said voltage level.

39. The system of claim 38 wherein said operational control means includes:
means to cause said capacitive means to charge when said high speed motor means is connected to the system; and
means to cause said capacitive means to discharge after the system is switched from the high speed to the low speed motor means.

40. The motor control system of claim 15 includes:

a voltage switch means for connecting AC voltage to the input of said switching network, said operational control means includes means for generating a disable signal for preventing current conduction through said switching network when said voltage switch means is switched from the off to the on position.

41. The motor control system of claim 40, wherein said operational control means further includes:
a delay circuit to maintain said disable signal for a pre-determined delay time period.

42. In an energy transfer system including an alternating current (AC) voltage and current source, a load means and a power control means for controlling the electrical energy transferred from the source to said load means, said power control means comprising:
a power switching network having an input end and an output end for transferring electrical energy from the input to the output;
a load switch means having an on-position and an off-position for associating and dis-associating said load from the output of the switching means;
an operational control means for controlling said energy transfer; and
means cooperating with said operational means for generating a disable signal when said switch means is switched from one position to the other position, to prevent said power switching network from transferring said energy.

43. The energy system of claim 42, wherein said operational control means includes means to cause the period of said energy transfer through said switching network to progressively increase from an initial period to a greater period per AC cycle after said disable signal is removed.

44. The energy transfer system of claim 42, wherein said switch means comprises an electromechanical switch means having said on-position and said off-position and including a line switch, said line switch connecting or disconnecting said load from the output of said switching network after said electromechanical switch means is switched from the off to the on-position or from the on to the off-position, and said means for preventing energy transfer including:
a break-arc suppressor means for causing a disabling signal to be generated after said electromechanical switch means is switched from the off to the on-position, for preventing said energy transfer through said switching network when said line switch disconnects said load from the output of the switching network.

45. The system of claim 44 wherein said break-arc suppressor means comprises:
sensing means for sensing the de-energizing of said electromechanical load switch means; and
gate means having a non-inhibit state and an inhibit state, said gate means switching to the inhibit state to provide said disabling signal when said sensing means senses the de-energizing of said mechanical switch means.

46. The system of claim 44 wherein said sensing means for sensing the voltage switch means includes:
a capacitor means to charge to a predetermined voltage when said voltage switch means is energized for switching said gate means to the non-inhibit state and thereby remove said inhibit signal.

47. The system of claim 46 wherein the discharge of said capacitor means causing said gate means to provide said inhibit signal when said electromechanical switch de-energizes.

48. The energy transfer system of claim 42, wherein said load switch means comprises an electromechanical switch means having an on-position and an off-position and including a line switch, said line switch connecting and disconnecting said load from the output of said switching network after said electromechanical switch means is switched from the on to the off-position or from an off to the on-position, and said means for preventing energy transfer including:

a make-arc suppressor means cooperating with said electromechanical switch means for causing a disabling signal to be generated after said electromechanical switch means is switched from the on to the off-position, for preventing energy transfer through said switching network when said line switch connects said load with the output of the switching network.

49. The system of claim 48, wherein said make-arc suppressor means comprises:
sensing means for sensing the energizing of said electromechanical load switch means; and
gate means having a non-inhibit state and an inhibit state, said gate means switching to the inhibit state to provide said disabling signal when said sensing means senses the energizing of said mechanical switch means.

50. The energy system of claim 42 includes:
a voltage switch means having an on-position and an off-position for associating and dis-associating said source from the input of the switching network; and
means cooperating with said operational control means for preventing said energy transfer through said switching network when said voltage means is switched from the on-position to the off-position.

51. The system of claim 42 includes:
an electromechanical voltage switch means including a line switch for connecting a voltage from an electrical source to the input of the switching network;

sensing means for sensing the energizing of said voltage switch means; and
gate means associated with said sensing means and having a non-inhibit state and an inhibit state, said gate means switching into said inhibit state to cause an inhibit signal for preventing said energy transfer when said voltage switch means energizes.

52. In an energy transfer system including an alternating current (AC) voltage and current source, a load means and a power control means for controlling the power transferred from the source to said motor means, said power control means comprising:
a power switching network having an input and an output for transferring electrical energy from the input to the output;
a switch means having an on-position and an off-position for connecting and dis-connecting said load from the output of the switching means;
an operational control means for controlling said energy transfer; and
means cooperating with said operational control means and said switch means for generating a turn-on signal when said switch means is switched from the off to the on-position, to cause the starting of said energy transfer after said load is connected with the output of the switching network.

53. The energy transfer system of claim 52, wherein said turn-on signal causing said energy transfer to be delayed for a predetermined time period prior to said starting of said energy transfer.

54. A method for controlling the transfer of electrical energy to a load, comprising the step of:
connecting alternating current (AC) voltage to the input to a power switching network;
preventing the transfer of electrical energy through said network when said voltage is connected;
connecting said load with the output of said switching network; and
preventing the transfer of electrical energy through said network when connecting the load to the output of the switching network.

55. The method of claim 54 includes:
providing a disabling signal to prevent current conduction through said switching network prior to disconnecting the load from the output of the switching network.

56. The method of claim 55, includes:
connecting a second load to the output of the switching network; and
preventing the transfer of electrical energy through said switching network when connecting said second load to said switching network.

57. The method of claim 56, wherein said first load includes a high speed motor means having a high "full" speed and said second load includes a low speed motor means having a low "full" speed, said high and low speed motor means driving an output drive shaft, and method further comprising:
progressively increasing the period per cycle of energy transfer through said switching network after said high speed motor means is connected to the output of the switching network, from an initial time period to a greater time period per AC cycle to cause said high speed motor means to progressively increase in speed until reaching said high speed; and
progressively increasing the period per cycle of energy transfer through said switching network after said low speed motor means is connected to the output of the switching network from an initial time period to a greater time period to progressively increase the counter torque of said low speed motor means for progressively decreasing the speed of said output shaft, until reaching said load speed.

58. The method of claim 57 further includes:
maintaining the initial time period for energy transfer at a predetermined time interval when decreasing the speed of said output drive shaft, and thereby generating a minimum counter torque for said time interval.

59. The method of claim 54 includes:
preventing said energy transfer when connecting the load to the output of the switching network for a pre-determined delay time period; and
increasing the time period per AC cycle for energy transfer to said load, from an initial time period to a greater time period after said delay time period.

60. The method of claim 56 includes:
maintaining the energy transfer through said switching system at said initial period per cycle for a predetermined time interval.

61. A method for driving an AC motor means having a high speed stator and a low speed stator to provide respectively a high speed and a low speed, comprising:

connecting AC energy to an electrical energy transfer system;
connecting said high speed stator to said electrical energy transfer system;

progressively increasing the period of electrical energy per alternating current (AC) cycle transferred to said high speed stator from an initial period to a greater period for accelerating the speed of said motor means toward said high speed;

preventing energy transfer through said energy transfer system when switching from one of said winding to the other;

disconnecting said high speed stator from said energy transfer system;

connecting said low speed stator to said energy transfer system; and progressively increasing the period of electrical energy per AC cycle transferred to said low speed stator from an initial period to a greater period, for progressively increasing the counter torque and thereby decelerating said motor means toward said low speed from a higher speed.

62. The energy system of claim 61, includes:

a delay means associated with said gate means, said delay means maintaining said gate means in said inhibit state for a predetermined time interval after said switch means switches from the off to the on-position.

63. The energy system of claim 62 includes:

a minimum energy timer means for maintaining the period of energy transfer through said switching network at a predetermined minimum period for a predetermined interval of time.

64. In an energy transfer system including an alternating current (AC) voltage and current source, a load means and a power control means for controlling the electrical energy transferred from the source to said load and a switch means associated with the power control means having an on-position to enable energy transfer to said load and an off-position to prevent said energy transfer to said load, said power control means comprising:

a power switching network having an input end and an output end for transferring electrical energy from the input to the output, said switch means being associated with one of said ends;

an operational control means for controlling said energy transfer;

sensing means for sensing when said switch means switches from one position to the other;

gate means having an inhibit state and a non-inhibit state, said gate means providing a disabling signal to prevent said energy transfer when in the inhibit state; and means associated with said sensing means and said gate means to cause said gate means to switch from the non-inhibit state to the inhibit state, when said switch means is switched from one position to the other position.

65. The energy system of claim 64 includes:

a time base generator means associated with said delay means and including means for generating a decaying function signal, said function signal decaying in voltage to cause the period of energy transfer through said switching nerwork to progressively increase.

66. The energy system of claim 65 includes:

a capacitor means for discharging from a first voltage to a lower voltage; and a switch having a go-condition and a no-go condition, said switch switching to the go-condition when said capacitor means discharges to said lower level, the period of energy transfer per cycle progressively increasing after said switch has switched into the go-condition, the period for energy transfer being at said minimum period per cycle when said capacitor discharges from said first to said lower voltage.

* * * * *